United States Patent
Thoukydides et al.

(10) Patent No.: US 8,121,107 B2
(45) Date of Patent: Feb. 21, 2012

(54) COMMUNICATION IN DUAL PROTOCOL ENVIRONMENTS

(75) Inventors: Alexander Thoukydides, Cambridge (GB); Steven Mark Singer, Cambridge (GB)

(73) Assignee: Cambridge Silicon Radio Limited, Cambridge (GB)

(*) Notice: Subject to any disclaimer, the term of this patent is extended or adjusted under 35 U.S.C. 154(b) by 926 days.

(21) Appl. No.: 12/088,453

(22) PCT Filed: Sep. 4, 2006

(86) PCT No.: PCT/GB2006/003260
§ 371 (c)(1),
(2), (4) Date: Jun. 9, 2008

(87) PCT Pub. No.: WO2007/036686
PCT Pub. Date: Apr. 5, 2007

(65) Prior Publication Data
US 2008/0253352 A1  Oct. 16, 2008

(30) Foreign Application Priority Data
Sep. 30, 2005 (GB) .................................. 0519946.8

(51) Int. Cl.
*H04J 1/00* (2006.01)
*H04J 3/00* (2006.01)
(52) U.S. Cl. ........................................ 370/345; 370/343
(58) Field of Classification Search .................. 370/343, 370/345
See application file for complete search history.

(56) References Cited

U.S. PATENT DOCUMENTS

| 6,920,171 | B2 * | 7/2005 | Souissi et al. ................. 375/133 |
|---|---|---|---|
| 7,035,275 | B2 * | 4/2006 | Liang ............................ 370/436 |
| 7,146,636 | B2 * | 12/2006 | Crosbie ............................ 726/7 |
| 7,366,471 | B1 * | 4/2008 | Kitchin ........................ 455/63.1 |
| 2004/0242159 | A1 * | 12/2004 | Calderon et al. ............. 455/63.3 |
| 2006/0292986 | A1 * | 12/2006 | Bitran et al. ................. 455/41.2 |
| 2007/0066222 | A1 * | 3/2007 | Tao et al. ..................... 455/41.2 |
| 2008/0130676 | A1 * | 6/2008 | Liu et al. ...................... 370/445 |

FOREIGN PATENT DOCUMENTS
WO 2005/020518 A1 3/2005

OTHER PUBLICATIONS

Chiasserini et al., "Coexistence Mechanisms for Interference Mitigation Between IEEE 802.11 WLANs and Bluetooth," Proceedings IEEE Infocom 2002, Conference on Computer Communications, Jun. 23, 2002, pp. 590-598, vol. 1, Conf. 21, IEEE, New York, NY.
Chiasserini et al., "A Comparison Between Collaborative and Non-collaborative Coexistence Mechanisms for Interference Mitigation in ISM Bands," IEEE Vehicular Technology Conference, May 6, 2001, pp. 2187-2191, vol. 3, Conf. 53, IEEE, New York, NY.
Kwok et al., "Design and Evaluation of Coexistence Mechanisms for Bluetooth and IEEE 802.11b Systems," PIMRC, Sep. 5, 2004, pp. 1767-1771, vol. 3, Hong Kong.
Shellhammer, "Collaborative Co-existence Mechanism: TDMA of Bluetooth and 802.11," IEEE 802.12-01/025r0, Jan. 2001.

* cited by examiner

*Primary Examiner* — Kenny Lin
(74) *Attorney, Agent, or Firm* — Novak Druce DeLuca + Quigg LLP

(57) ABSTRACT

A radio transceiver comprising: a signal receiver for receiving signals in the form of bursts according to a first protocol; a transmitter for transmitting signals in the form of bursts according to a second protocol, the first and second protocols being such that signals of the first and second protocols are mutually interfering; a transmission scheduler for predicting, based on the timings of signal bursts of the first protocol received by the receiver, the timings of future bursts of the first protocol and arranged to influence the transmitter to transmit bursts according to the second protocol so as to avoid the signal bursts of the first protocol as predicted.

13 Claims, 4 Drawing Sheets

COMMUNICATION IN DUAL PROTOCOL ENVIRONMENTS

This invention relates to communication in environments where interference from signals relating to one communication protocol can hinder the reception of signals relating to another communication protocol.

One example of such an environment is when transceivers for two protocols that occupy the 2.4 GHz ISM (industrial, scientific, and medical) band are located close to each other or even in the same device: for instance a handheld communication device. As an example, a transceiver for IEEE 802.11b/g wireless LAN (local area network) signals could be located near to or in the same device as a transceiver for Bluetooth signals. IEEE 802.11b/g and Bluetooth share the 2.4 GHz band, resulting in mutual interference between the two protocols. Because of this mutual interference it is desirable to adopt a coexistence scheme that enhances the ability of a receiver for one of those protocols to operate in the presence of interference from signals of the other protocol.

Existing coexistence schemes, such as Bluetooth AFH (adaptive frequency hopping) and IEEE 802.15.2 PTA (packet traffic arbitration) are inadequate to support high duty-cycle operation of both IEEE 802.11 and Bluetooth when transceivers for each protocol are located close to each other. This is because it is not possible for an IEEE 802.11b/g receiver to successfully receive packets at the same time that a closely co-located Bluetooth transmitter is transmitting (even if AFH is used to avoid operation on the same frequency). Since there is also no control over when a peer IEEE 802.11 device will attempt to transmit data, IEEE 802.11 data will be lost if it happens to arrive when the Bluetooth transmitter is transmitting. The resulting packet failures trigger IEEE 802.11's exponential back-off behaviour resulting in exceedingly poor throughput and high latency.

This behaviour is particularly problematic for applications that are sensitive to latency problems, such as VoIP (voice over internet protocol). One example of a particularly problematic situation is when a mobile voice handset is receiving voice data via VoIP from an IEEE 802.11 access point (AP) and relaying the voice data to a headset by a synchronous Bluetooth link. This situation is illustrated in FIG. 1. The transmission and reception of voice packets by both the IEEE 802.11 and Bluetooth transceivers of the handset are essentially periodic (with some jitter). However, there is no synchronisation and the periodicity is different for the two radios, so collisions between packets are inevitable. Without any effective protection mechanism almost every IEEE 802.11 packet from the AP to the handset could be corrupted. Since the traffic is voice traffic, and therefore cannot tolerate significant delays, the collisions can result in very poor audio transfer.

There is therefore a need for a mechanism to improve coexistence between systems such as IEEE 802.11 and Bluetooth.

According to the present invention there is provided a radio transceiver comprising: a signal receiver for receiving signals in the form of bursts according to a first protocol; a transmitter for transmitting signals in the form of bursts according to a second protocol, the first and second protocols being such that signals of the first and second protocols are mutually interfering; a transmission scheduler for predicting, based on the timings of signal bursts of the first protocol received by the receiver, the timings of future bursts of the first protocol and arranged to influence the transmitter to transmit bursts according to the second protocol so as to avoid the signal bursts of the first protocol as predicted.

The transmission scheduler could comprise a burst timing estimator for estimating the timings of future bursts of the first protocol and forming a timing signal indicative of the predicted timing of a future burst according to the first protocol, and a transmission controller arranged to operate in dependence on the timing signal to influence the transmitter to transmit bursts according to the second protocol to avoid the predicted signal bursts of the first protocol.

The burst timing estimator may comprise a phase-locked loop arranged to estimate the differences between the timings of bursts of the first protocol as previously estimated by the burst timing estimator and the actual timings of bursts of the first protocol.

The burst timing estimator may be arranged to alter its estimation of the timings of future bursts of the first protocol in dependence on the said estimated differences.

One of the first and second protocols could be a wireless local area network protocol. One of the first and second protocols could be Bluetooth. One of the first and second protocols is the Bluetooth SCO or eSCO protocol.

The first and second protocols may carry delay-critical data. The first and second protocols may carry voice data.

The transmitter is preferably arranged to relay traffic data received by the first protocol by transmitting it according to the second protocol.

The bursts are preferably packets.

The transmitter and the receiver may have antennas and the antennas may be located such that signals of the second protocol transmitted by the antenna are capable of interfering with signals of the first protocol so as to prevent signals of the first protocol from being successfully received at the receiver.

The first and second protocols are preferably different.

According to a second aspect of the present invention there is provided a method for operating a radio transceiver comprising a signal receiver for receiving signals in the form of bursts according to a first protocol and a transmitter for transmitting signals in the form of bursts according to a second protocol, the first and second protocols being such that signals of the first and second protocols are mutually interfering; the method comprising predicting, based on the timings of signal bursts of the first protocol received by the receiver, the timings of future bursts of the first protocol; and influencing the transmitter to transmit bursts according to the second protocol so as to avoid the signal bursts of the first protocol as predicted.

The present invention will now be described by way of example with reference to the accompanying drawings.

In the drawings:

FIG. 2 shows schematically a system in which the present invention can be employed.

Figure 1:
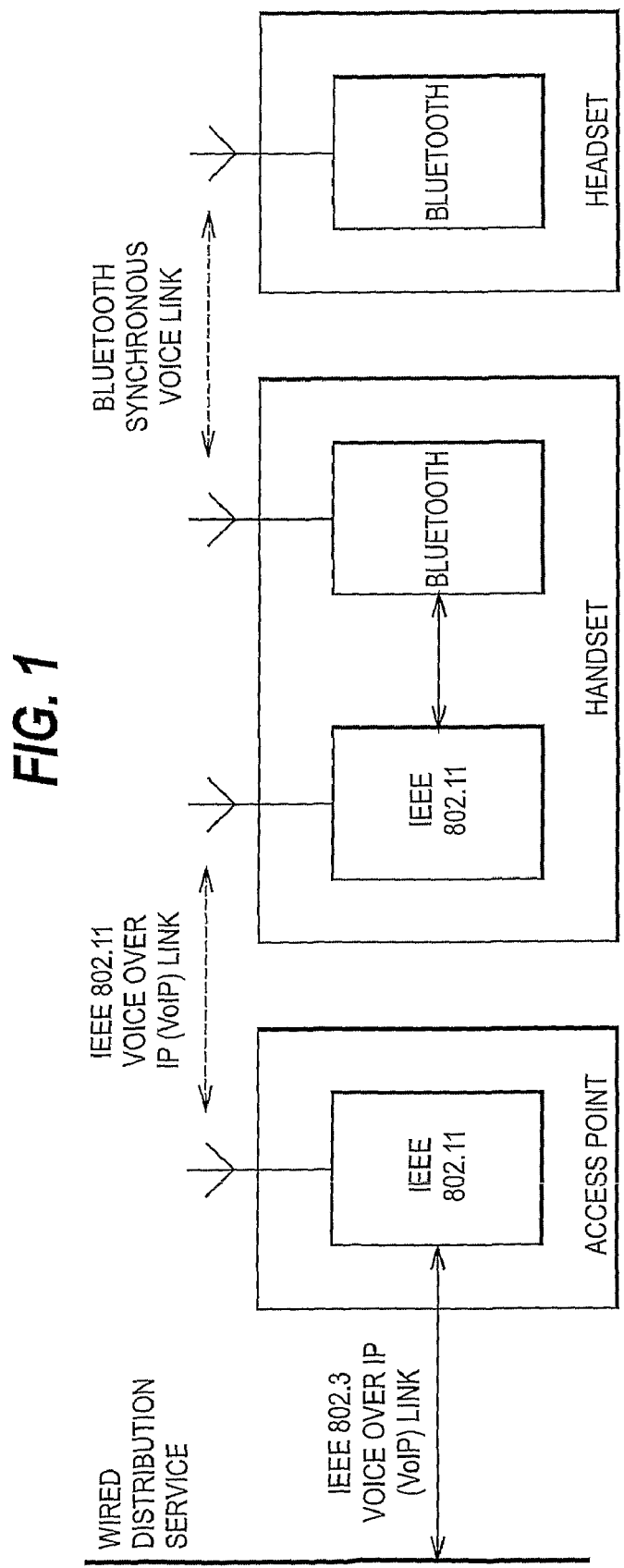
FIG. 1 shows the relaying of voice data through a handset to a headset.
Figure 2:
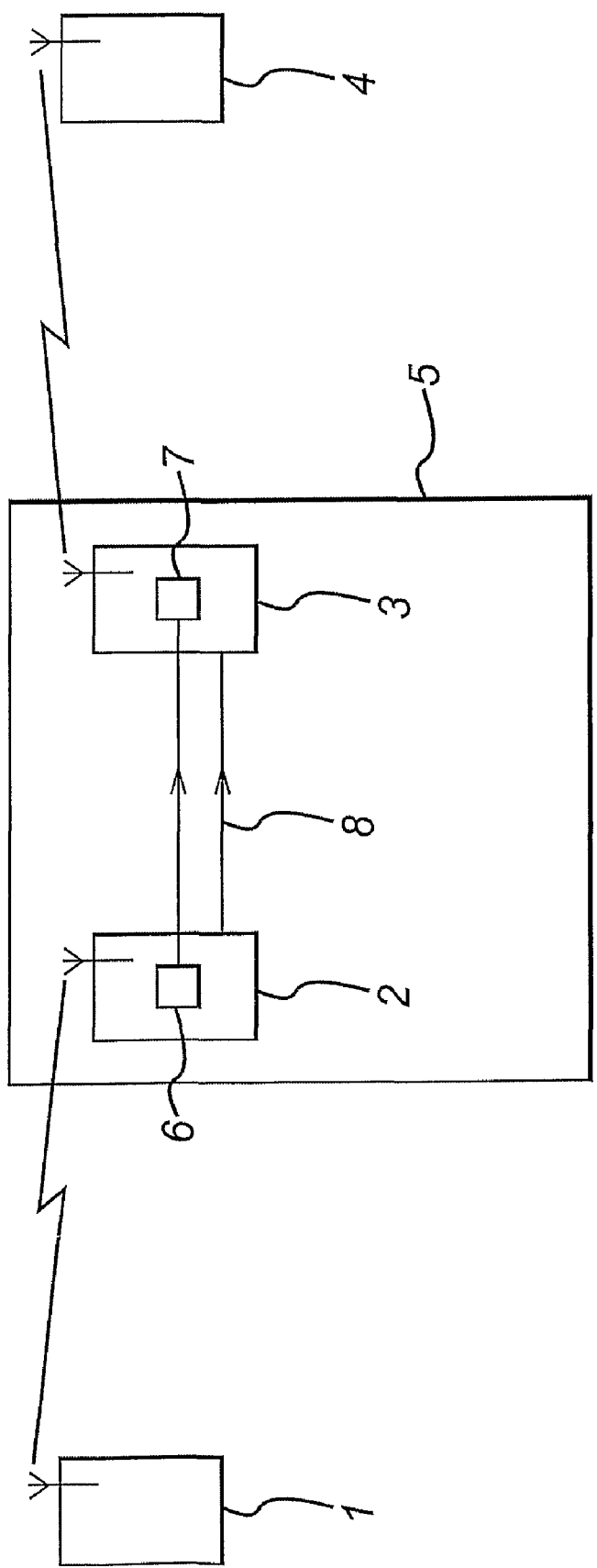
FIG. 2 shows a radio transceiver in which the present invention can be employed.

The system comprises a transmitter 1 and a receiver 2 for signals according to a first radio protocol, and a transmitter 3 and a receiver 4 for signals according to a second radio protocol. The receiver 2 and the transmitter 3 are co-located in a device 5. The first radio protocol is one in which transmission of signals occurs in bursts (e.g. packets) and some periodicity can be expected in the timing of those bursts. The second radio protocol is one in which the timings of transmission of signals by the transmitter 3 can be influenced and varied during operation. One example of such a situation is where the first radio protocol is VoIP via IEEE 802.11 and the second protocol is Bluetooth.

The receiver 2 comprises a timing detection unit 6. The timing detection unit detects the timing of signals of the first protocol received by the receiver 2. The timing detection unit is connected to a timing control unit 7 of the transmitter 3. The timing control unit controls the timing of signals transmitted by the transmitter 3 in dependence on signals received from the timing detection unit with the aim of causing signals to be transmitted by the transmitter 3 when signals of the first protocol are not expected to be received. It does this using knowledge of when signals of the first protocol have been received (derived from the timing detection unit) and knowledge of the expected period between those signals. The knowledge of the expected period may be pre-programmed into the timing control unit or may be derived by it from the timings of previously received signals detected by the timing detection unit. Once the expected timing of one or more future received signals of the first protocol is determined, the signals of the second protocol are scheduled to be transmitted at times that avoid the times when signals of the first protocol are expected to be received. There is a data path 8 whereby traffic data extracted by the receiver 2 from the signals it has received can be passed to the transmitter 3 for onward transmission. Although the data path 8 would be expected to be present in many embodiments, it is not essential. Examples of applications that do not require it are multi-player gameplay via IEEE 802.11 and local game sound effects using Bluetooth.

Figure 3:
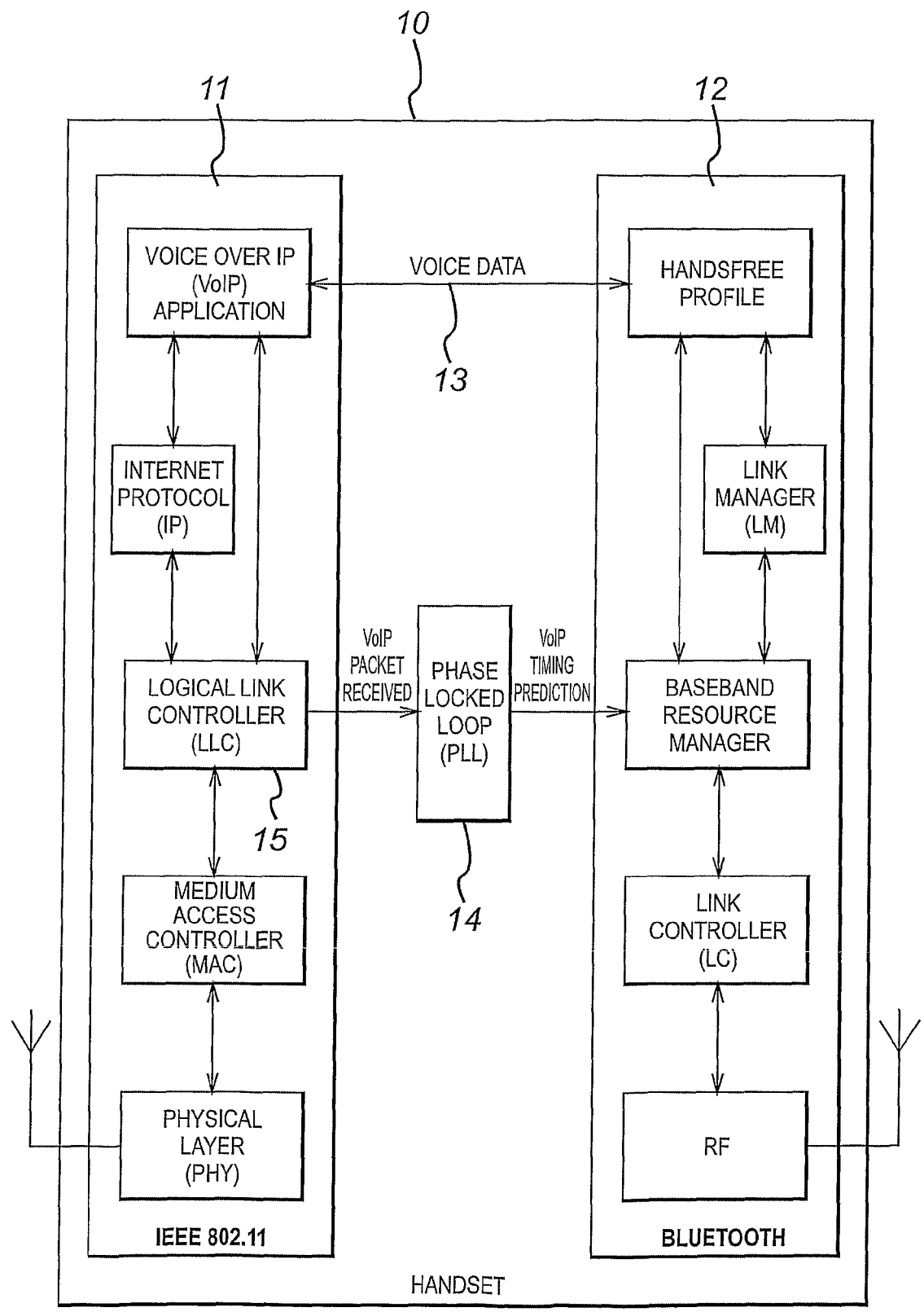
FIG. 3 shows another radio transceiver in which the present invention can be employed.

FIG. 3 shows in more detail an example of a device that implements the method described above. The device of FIG. 3 is a communication device such as a mobile phone handset 10. The device comprises an IEEE 802.11 transceiver section 11 and a Bluetooth transceiver section 12. The IEEE and Bluetooth transceivers are linked in two ways. Firstly, voice data can pass at 13 between the VoIP application of the IEEE 802.11 transceiver and the handsfree profile of the Bluetooth transceiver. Secondly, timing data is passed between the transceivers via a phase-locked loop (PLL) 14.

The receipt of a VoIP packet by the IEEE 802.11 transceiver is detected by that transceiver, conveniently by a demultiplexing layer of the transceiver after the packet has been correctly received and identified, although it could in principle be generated by any layer of the protocol stack. In the example of FIG. 3 this is in the logical link controller (LLC) 15. For the method to be at its most effective, the variation in delay between the packet being on the air and the signal being generated should be small compared to the period of either system.

The PLL 14 can then be used to predict the timing of the next VoIP packet, or more accurately the expected probability distribution of it occurring at different times. Information on the predicted timing of received VoIP packets is then passed to the Bluetooth host controller (conveniently to the baseband resource manager 16). This adjusts the scheduling of eSCO (extended SCO) transmissions to avoid the expected time of the VoIP packet.

Many ways are available for the PLL 14 to predict the packet timing. Some options include the following:

1. A traditional PLL architecture can be used, in which for each received VoIP packet the error between the actual and predicted time is used as feedback to adjust the period and offset for predicting future packets. An averaged version of this error measurement can also provide a measure of likely error in the prediction, so can be used to estimate a probability distribution (for instance by assuming a normal distribution). A more accurate probability distribution could be generated by maintaining a histogram of the error measurements.
2. A simpler scheme is to merely add the interval between the last two VoIP packets to the time at which the last packet was received to obtain a prediction of the time of the next packet. Instead of the interval between the last two packets the mean of the intervals between a number of the last-received packets could be used.
3. A more mathematical approach is to record the time at which the last n VoIP packets were received, and to use linear regression (such as a least-square line fit) to extrapolate the likely time of future packets. The correlation coefficient gives a measure of the timing jitter and hence the expected distribution of future packets.

The adjustment of the scheduling of the transmitted data may be done in a variety of ways. One preferred method is for the transmitter to avoid transmitting data during a time when the estimated probability of interfering signals being present exceeds a certain value, unless it is necessary to override that criterion due to other demands on the transmitter. The unit that determines the expected timing of the next interfering signal may provide to the transmission scheduler an indication of the time when the next interfering signal is expected. The transmission scheduler may then attempt to maximise the time difference between that time and the time when it causes data to be transmitted.

In operation, the worst case network usage for VoIP via IEEE 802.11 would be 0.7 ms to receive a 200 octet packet at 11 Mbit/s every 20 ms for G.711 compression. This could be expected to clash with up to three Bluetooth slots. However, timing jitter (e.g. caused by other network traffic) would result in a greater number of slots having the possibility of a collision. If the Bluetooth voice link is using 3-EV3 packets then a standard (64 kbit/s) voice link requires a single slot pair every 18 Bluetooth slots (11.25 ms). This allows a choice of up to nine slot pairs for the scheduling of each eSCO exchange, giving plenty of flexibility to minimise the risk of using slots that collide with the VoIP packet being received by the co-located IEEE 802.11 radio.

Figure 4:
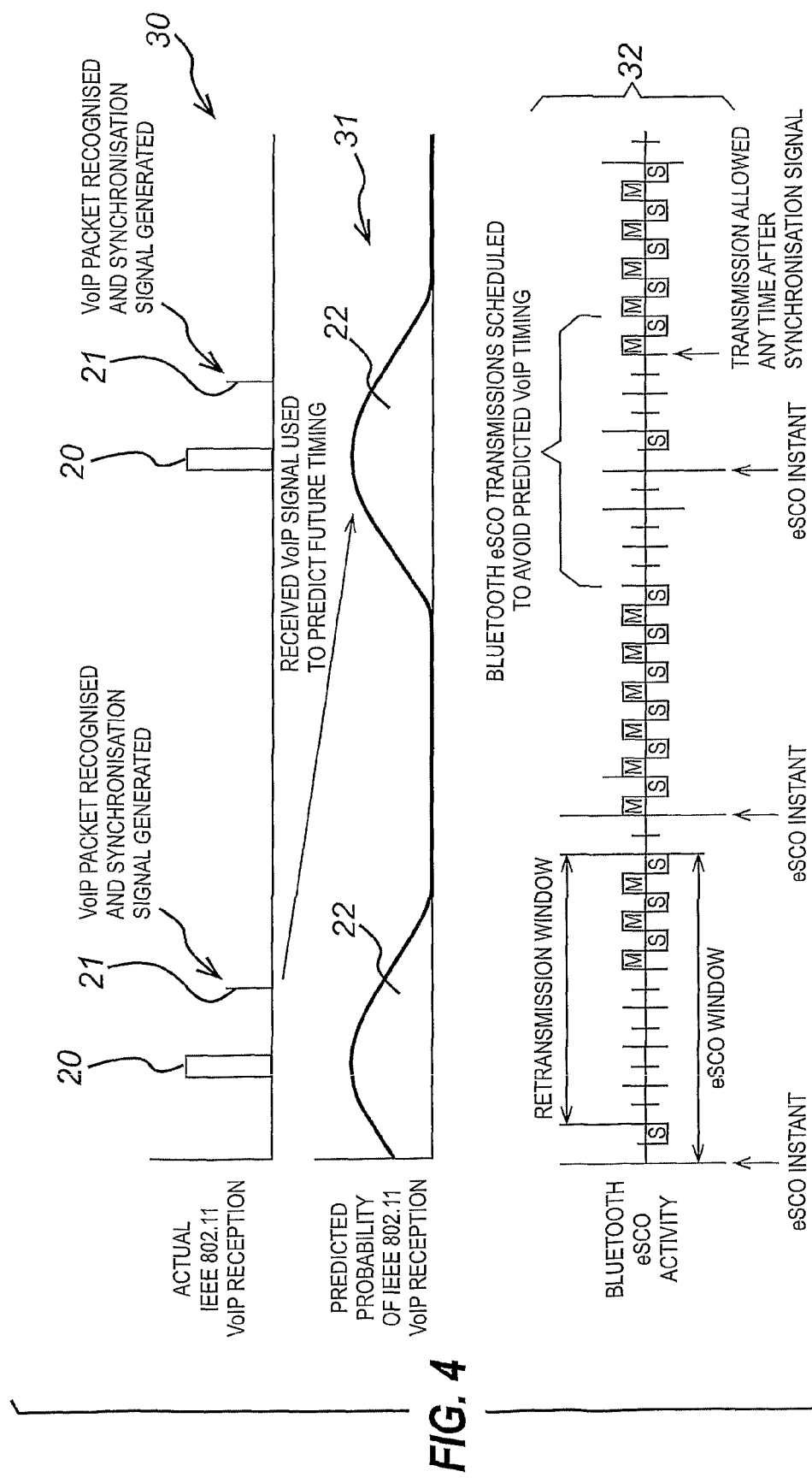
FIG. 4 illustrates signal timing.

FIG. 4 illustrates the operation of such a system with the collocated Bluetooth device as master of the voice link and an eSCO retransmission window size of seven slot pairs. In the example of FIG. 4, the upper plot 30 illustrates the timing of reception and analysis of IEEE 802.11 packets. Packets are on the air at 20 and recognised shortly afterwards at 21. The variation in spacing between 20 and 21 is preferably small relative to the period between successive packet timings 20. Using knowledge of the expected period between packets, and the delay between receiving and recognising packets, the timing of one packet (optionally combined with the timings of earlier packets) is used to predict the likely range of timing of the next packet, as illustrated at 22 in plot 31. Plot 31 shows the predicted probability of an IEEE 802.11 voice packet being received over time. The lower plot 32 illustrates Bluetooth eSCO activity. The Bluetooth scheduler preferentially transmits Bluetooth data outside the range in which the timing of an IEEE 802.11 packet is determined to be most likely.

The technique described above does not rely on any advanced IEEE 802.11 features that may not always be available, thereby allowing wide compatibility with existing IEEE 802.11 access points. Additionally, it only requires very simple functionality to generate the synchronisation signal to the PLL, enabling it to be used with most, if not all, IEEE 802.11 implementations. Similarly, only standard Bluetooth functionality is used, with a simple extension to the scheduling algorithms. This allows interoperability to be maintained with other Bluetooth devices, and could typically be implemented in software.

The method can be used with protocols other than IEEE 802.11 and Bluetooth, and within Bluetooth it is not limited to use with eSCO signals. This invention is beneficial when used with any two communications technologies that suffer from mutual interference when operated simultaneously, and where the activity of one system is essentially periodic and the second system has some flexibility in the scheduling of its activity. It could also be used with a single communications technology that may maintain multiple active communications links but can only operate on one at a time, e.g. a Bluetooth device that is operating in a scatternet.

The expected timing of the received signals could be expressed and processed in a number of ways. First, the means that estimates the expected timing could estimate the time at which signals are most likely to be received (or the time interval until then), and pass that data to a unit that determines when to schedule transmissions. That unit could then attempt to schedule transmissions as far as possible from that time whilst complying with any need to send the transmissions in a timely manner. Alternatively, the unit that determines when to schedule transmissions could have access to information indicating the estimated probability that transmissions will occur at times around the expected time. That information could be stored or estimated based on the timings of previously received signals, either by that unit or by the means that estimates the expected timing (in which case it could be transmitted to the unit that determines when to schedule transmissions). The unit that determines when to schedule transmissions could then schedule transmissions to take place at times having as low an estimated probability as possible of coinciding with received signals, whilst complying with any need to send the transmissions in a timely manner. The means that estimates the expected timing and the unit or means that determines when to schedule transmissions could be in the same component of the system.

Means other than a PLL can be used to derive the timing prediction data. For instance, a DSP (digital signal processor) could be used to analyse the received packet timings and generate the prediction data.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A radio transceiver comprising:
a signal receiver for receiving signals in the form of bursts according to a wireless local area network protocol;
a transmitter for transmitting signals in the form of bursts according to a Bluetooth protocol, the wireless local area network protocol and the Bluetooth protocol being such that signals of the wireless local area network protocol and the Bluetooth protocol are mutually interfering;
a transmission scheduler for predicting, based on the timings of signal bursts of the wireless local area network protocol received by the receiver, the timings of future bursts of the wireless local area network protocol received by the receiver and arranged to influence the transmitter to transmit bursts carrying delay-critical data according to the Bluetooth protocol using slots chosen so as to avoid the signal bursts of the first wireless local area network protocol as predicted.

2. A radio transceiver as claimed in claim 1, wherein the transmission scheduler comprises a burst timing estimator for estimating the timings of future bursts of the wireless local area network protocol and forming a timing signal indicative of the predicted timing of a future burst according to the wireless local area network protocol, and a transmission controller arranged to operate in dependence on the timing signal to influence the transmitter to transmit bursts according to the Bluetooth protocol to avoid the predicted signal bursts of the wireless local area network protocol.

3. A radio transceiver as claimed in claim 2, wherein the burst timing estimator comprises a phase-locked loop arranged to estimate the differences between the timings of bursts of wireless local area network protocol as previously estimated by the burst timing estimator and the actual timings of bursts of the wireless local area network protocol.

4. A radio transceiver as claimed in claim 3, wherein the burst timing estimator is arranged to alter its estimation of the timings of future bursts of the wireless local area network protocol in dependence on the said estimated differences.

5. A radio transceiver as claimed in claim 1, wherein the signals of the Bluetooth protocol are SCO or eSCO transmissions.

6. A radio transceiver as claimed in claim 1 wherein the wireless local area network protocol is carrying delay-critical data.

7. A radio transceiver as claimed in claim 1 wherein the wireless local area network protocol and the Bluetooth protocol are carrying voice data.

8. A radio transceiver as claimed in claim 1, wherein the transmitter is arranged to relay traffic data received by the wireless local area network protocol by transmitting it according to the Bluetooth protocol.

9. A radio transceiver as claimed in claim 1, wherein the bursts are packets.

10. A radio transceiver as claimed in claim 1, wherein the transmitter and the receiver have antennas and the antennas are located such that signals of the Bluetooth protocol transmitted by the antenna are capable of interfering with signals of the wireless local area network protocol so as to prevent signals of the wireless local area network protocol from being successfully received at the receiver.

11. A radio transceiver as claimed in claim 1, wherein the predicted timings of future bursts of the wireless local area network protocol are extrapolated from a predicted distribution of timings of future bursts of the wireless local area network protocol.

12. A radio transceiver as claimed in claim 1, wherein each predicted timing of a future burst of the wireless local area network protocol is a likely range of timings of a future burst of wireless local area network protocol.

13. A method for operating a radio transceiver comprising a signal receiver for receiving signals in the form of bursts according to a wireless local area network protocol and a transmitter for transmitting signals in the form of bursts according to a Bluetooth protocol, the wireless local area network and the Bluetooth protocol being such that signals of the wireless local area network protocol and the Bluetooth protocol are mutually interfering; the method comprising:
predicting, based on the timings of signal bursts of the wireless local area network protocol received by the receiver, the timings of future bursts of the wireless local area network protocol received by the receiver; and influencing the transmitter to transmit bursts carrying delay-critical data according to the Bluetooth protocol using slots chosen so as to avoid the signal bursts of the wireless local area network protocol as predicted.

* * * * *